(12) United States Patent
Rudolph (10) Patent No.: US 11,338,426 B2
(45) Date of Patent: May 24, 2022

(54) CORDLESS POWER CUTTER

(71) Applicant: BLACK & DECKER INC., New Britain, CT (US)

(72) Inventor: Scott M. Rudolph, Aberdeen, MD (US)

(73) Assignee: Black & Decker, Inc., New Britain, CT (US)

( * ) Notice: Subject to any disclaimer, the term of this patent is extended or adjusted under 35 U.S.C. 154(b) by 333 days.

(21) Appl. No.: 15/338,476

(22) Filed: Oct. 31, 2016

(65) Prior Publication Data
US 2017/0120436 A1 May 4, 2017

Related U.S. Application Data

(60) Provisional application No. 62/249,866, filed on Nov. 2, 2015.

(51) Int. Cl.
| | |
|---|---|
| *B23D 45/16* | (2006.01) |
| *B23D 47/12* | (2006.01) |
| *B24B 27/08* | (2006.01) |
| *B25F 5/02* | (2006.01) |
| *B27B 9/00* | (2006.01) |
| *B28D 1/04* | (2006.01) |

(52) U.S. Cl.
CPC .............. *B25F 5/02* (2013.01); *B23D 45/16* (2013.01); *B23D 47/12* (2013.01); *B24B 27/08* (2013.01); *B27B 9/00* (2013.01); *B28D 1/04* (2013.01); *B28D 1/045* (2013.01)

(58) Field of Classification Search
CPC ...... B23D 45/16; B23D 45/165; B24B 27/08; B24B 27/085

USPC .................................................. 83/277.4, 388
See application file for complete search history.

(56) References Cited

U.S. PATENT DOCUMENTS

| | | | |
|---|---|---|---|
| 1,848,817 A | 3/1932 | Aurand | |
| 2,544,461 A | 3/1951 | Leitzel | |
| (Continued) | | | |

FOREIGN PATENT DOCUMENTS

| | | |
|---|---|---|
| CN | 204191166 U | 3/2015 |
| CN | 204386125 U | 6/2015 |
| (Continued) | | |

OTHER PUBLICATIONS

Dewaele, Karl—European Search Report re: related application, Publication No. EP16196807—dated Aug. 8, 2017—12 pages—The Hague.

*Primary Examiner* — Clark F Dexter
(74) *Attorney, Agent, or Firm* — Rhonda Barton (57) ABSTRACT

The cordless power cutter that is lightweight and weight-balanced between a power section housing a battery pack as a power source and a cutting section including a motor in a belt-free drive system and rotatable disk blade. The weight balancing of the cordless power cutter allows the tool to remain parallel to a horizontal surface, such as the ground, without tilting, when the operator lifts and holds the tool by only a gripping or transverse portion of the lifting handle. The motor has a motor axis that is not perpendicular to the disk axis and that is rearward of the disk axis to provide a depth of cut. The weight-balance and motor positioning allows the cordless power cutter to achieve ease of handling and operation.

20 Claims, 7 Drawing Sheets

(56) References Cited

U.S. PATENT DOCUMENTS

| | | | |
|---|---|---|---|
| 2,610,657 A * | 9/1952 | Kiekhaefer | B27B 17/10 |
| | | | 30/383 |
| 2,664,119 A | 12/1953 | Spearman | |
| 3,006,388 A * | 10/1961 | Root | B27B 17/0008 |
| | | | 30/383 |
| 3,646,837 A | 3/1972 | Reynolds | |
| 3,747,441 A | 7/1973 | Amtsberg et al. | |
| 3,785,442 A | 1/1974 | Amtsberg et al. | |
| 3,797,335 A | 3/1974 | Amtsberg et al. | |
| 3,877,284 A | 4/1975 | Amtsberg et al. | |
| 3,880,023 A | 4/1975 | Amtsberg et al. | |
| 3,901,098 A | 8/1975 | Jinkins | |
| 4,576,073 A | 3/1986 | Stinson | |
| 4,827,810 A | 5/1989 | Rushanan | |
| 4,879,758 A | 11/1989 | DeLuca et al. | |
| 4,930,583 A | 6/1990 | Fushiya et al. | |
| 5,075,976 A | 12/1991 | Young | |
| 5,099,160 A | 3/1992 | Strozel et al. | |
| 5,637,035 A | 6/1997 | Yee | |
| 5,675,200 A | 10/1997 | Hayashi | |
| 5,743,145 A | 4/1998 | Terada et al. | |
| 6,244,358 B1 | 6/2001 | Beer et al. | |
| 7,059,947 B2 | 6/2006 | Crover | |
| 7,063,606 B2 | 6/2006 | Stierle et al. | |
| 7,131,897 B2 | 11/2006 | Crover | |
| 7,150,935 B2 | 12/2006 | Hamada et al. | |
| 7,375,447 B2 | 5/2008 | Oomori et al. | |
| 7,963,346 B2 | 6/2011 | Brodin | |
| 8,060,986 B1 * | 11/2011 | Green | B25F 5/026 |
| | | | 16/426 |
| 8,076,023 B2 | 12/2011 | Ichinose et al. | |
| 8,221,197 B2 | 7/2012 | Boeck et al. | |
| 8,231,436 B2 | 7/2012 | Boeck et al. | |
| 8,282,446 B2 | 10/2012 | Sulea et al. | |
| 8,454,411 B2 | 6/2013 | Boeck et al. | |
| 8,454,412 B2 | 6/2013 | Esenwein | |
| 8,460,070 B2 | 6/2013 | Boeck et al. | |
| 8,464,807 B2 | 6/2013 | Johnen et al. | |
| 8,512,104 B2 | 8/2013 | Nagy | |
| 8,939,816 B2 | 1/2015 | Chen | |
| D744,800 S | 12/2015 | Cooksey et al. | |
| D767,961 S | 10/2016 | Cooksey et al. | |
| 9,475,172 B2 | 10/2016 | Cooksey et al. | |
| 2002/0166240 A1 * | 11/2002 | Duford et al. | B23D 47/12 |
| | | | 30/277.4 |
| 2007/0117499 A1 | 5/2007 | Chen | |
| 2008/0244910 A1 | 10/2008 | Patel | |
| 2009/0313831 A1 | 12/2009 | Patel | |
| 2010/0218386 A1 * | 9/2010 | Robkamp | A01G 3/053 |
| | | | 30/277.4 |
| 2010/0299944 A1 * | 12/2010 | Hellberg | B23D 45/165 |
| | | | 30/390 |
| 2010/0325903 A1 | 12/2010 | Patel | |
| 2012/0321912 A1 | 12/2012 | Hachicuka et al. | |
| 2014/0215838 A1 * | 8/2014 | Bergquist | B27B 17/0008 |
| | | | 30/383 |
| 2016/0093854 A1 | 3/2016 | Tyler et al. | |
| 2016/0297051 A1 | 10/2016 | Aiken et al. | |
| 2016/0297052 A1 | 10/2016 | Aiken et al. | |
| 2017/0057075 A1 | 3/2017 | Takeda | |

FOREIGN PATENT DOCUMENTS

| | | |
|---|---|---|
| EP | 2832497 A1 | 2/2015 |
| GB | 749974 | 6/1956 |
| WO | 0178929 A1 | 10/2001 |
| WO | 2008018611 A1 | 2/2008 |
| WO | 2012024539 A1 | 2/2012 |

* cited by examiner

CORDLESS POWER CUTTER

CROSS-REFERENCE TO RELATED APPLICATIONS

The present application claims priority under 35 U.S.C. § 119(e) to U.S. Provisional Application No. 62/249,866 entitled: Cordless Cutoff Saw filed Nov. 2, 2015, which is hereby incorporated by reference in their entirety.

FIELD OF THE INVENTION

The invention relates to a power cutter.

BACKGROUND OF THE INVENTION

Current gas, electric, pneumatic and hydraulic powered cutting tools or power cutters, such as cutoff saws, are heavy, unwieldy and require power sources that are inconvenient, loud and problematic. For example, a cutoff saw that is powered by electricity through a power cord requires external electric power and a facility to plug in the power cord. When work environments do not have available electricity, the corded cutoff saw is nonfunctional. A cutoff saw that is powered by gasoline is heavy, loud, emits exhaust and requires the operator to handle gasoline to operate the saw. A cutoff saw that is pneumatically or hydraulically powered requires an air compressor or hydraulic pump, respectively. As such, there is a strong need for a different type of cutoff saw.

SUMMARY OF THE INVENTION

In an embodiment, a cordless power cutter includes a housing disposed along a longitudinal axis of the cordless power cutter; a power source removably supported by the housing at one end of the housing; a motor mounted to a longitudinally opposite end of the housing, the motor having a motor shaft rotatable about a motor axis, the motor being powered by the power source; a belt-free drive system proximal to and driven by the motor at said longitudinally opposite end of the housing; a disk having a disk axis not perpendicular to the motor axis, the disk being rotated by the belt-free drive system; a lifting handle mounted to the housing, the lifting handle having a lifting handle axis that is arranged traverse to the longitudinal axis; and a center of gravity defining a balancing plane. The lifting handle axis is on the balancing plane.

The disk axis can be parallel to the motor axis, or have any geometric relationship other than perpendicular.

In an embodiment, the belt-free drive system includes the motor as part of the system. For example, the belt-free-drive system can include the motor within a motor housing, the motor shaft, an output gear driven by the motor shaft, and an output shaft driven by the output gear. The disk is clamped to the output shaft so that the output shaft rotates the disk.

The motor and the disk are disposed together on the cordless power cutter housing at a front end of the housing, while the power source is disposed on or within the cordless power cutter housing at a rear end thereof. Although the motor and the disk are disposed together at a front end of the housing, the motor is disposed slightly rearward of the disk, in the direction of the rear end of the housing.

The housing has a top side on which the lifting handle is mounted and the motor axis is positioned closer to the top side than the disk axis. The higher position of the motor axis allows for a greater depth of cut of the cordless power cutter.

In an embodiment, the motor can be an electric motor and the belt-free drive system can be a transmission system. The power source can be a battery pack that includes one or more batteries. In various embodiments, the cordless power cutter can be a cordless cutoff saw or a cordless concrete saw and the disk can be a cutting blade, an abrasive blade or a grinding blade.

At least one base member can be provided on the cordless power cutter, for example on a bottom portion of the housing and be configured to position the disk to be free of contact with a surface when the at least one base member rests upon the surface.

In an embodiment, the cordless power cutter includes a housing disposed along a longitudinal axis of the cordless power cutter, the housing having a first end and a longitudinally opposite second end; a cutting section at the first end of the housing, the cutting section including an electric motor and a disk blade rotatably driven by the electric motor and having a first weight; a power section at the second end of the housing, opposite to the first end, the power section including a battery that supplies power to the electric motor, a trigger handle, and having a second weight different from the first weight; and a lifting handle having a lifting handle axis, the lifting handle being disposed on the housing between the cutting section and the power section along the longitudinal axis, and on a balancing plane that is between the power section and the cutting section.

The balancing plane of the cordless power cutter evenly bisects the lifting handle through the lifting handle axis and is coplanar to a lifting handle plane at a point along the longitudinal axis. The lifting handle can be located on a top side of the housing and at least one base member can be located on a bottom side of the housing. The center of gravity of the cordless power cutter is located between the lifting handle axis and a bottom side of the housing. A moment arm of a center of mass of the power section is substantially equal to a moment arm of a center of mass of the cutting section.

BRIEF DESCRIPTION OF THE DRAWINGS

The present invention in its several aspects and embodiments solves the problems discussed above and significantly advances the technology of power cutters. The present invention can become more fully understood from the detailed description and the accompanying drawings, wherein.

Herein, like reference numbers in one figure refer to like reference numbers in another figure.

DETAILED DESCRIPTION OF THE INVENTION

The power cutter in its numerous and varied embodiments herein is cordless, balanced, and achieves high performance and ease of operator use. The power cutter can be a cordless cutoff saw, a cordless concrete saw, a cordless metal saw, or any other type of saw.

Figure 1:
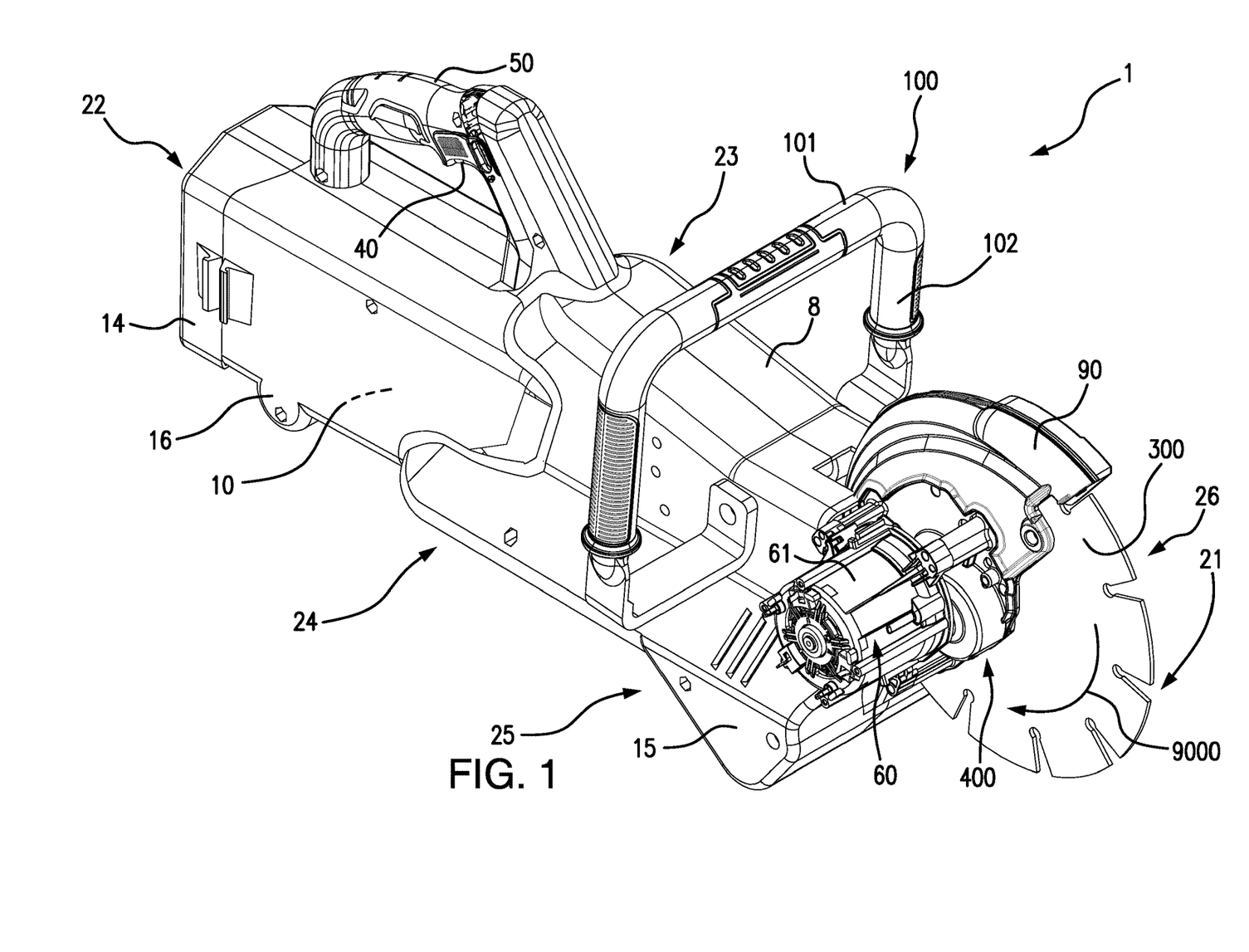
FIG. 1 is a perspective view of the power cutter.
Figure 2:
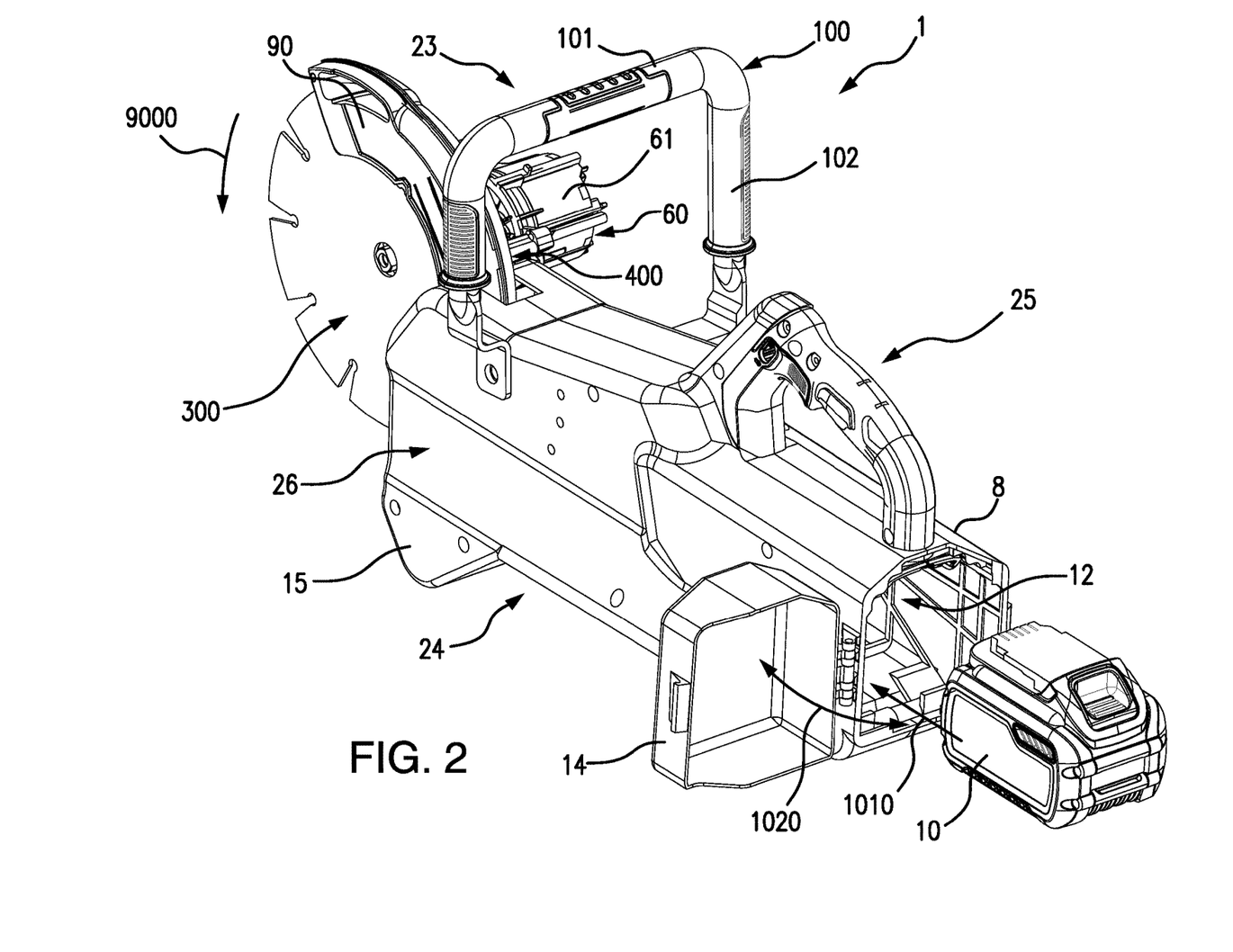
FIG. 2 is a perspective view of the power cutter showing a battery pack and battery compartment.

FIGS. 1 and 2 are front and rear perspective views of a power cutter 1 according to an embodiment of the present invention. The power cutter 1 can cut and/or grind a variety of different materials, including concrete, metal and wood. The power cutter can be a construction saw, a demolition saw or used for other purposes or in other environments. In an embodiment of the present invention, the power cutter 1 can be a cordless cutoff saw as illustrated in FIG. 1

The power cutter 1 shown in FIG. 1 is a handheld unit having a housing 8 that contains a battery pack 10 for providing power to the power cutter and for mounting thereon a disk blade or disk 300. The housing 8 can be formed of any material including, but not limited to plastic, metal or a composite material. The housing 8 has a front end 21, and a rear end 22, a top side 23, a bottom side 24, a motor side 25 (right side as viewed by the operator) and a disk side 26 (left side as viewed by the operator) laterally opposite to the motor side.

Figure 7:
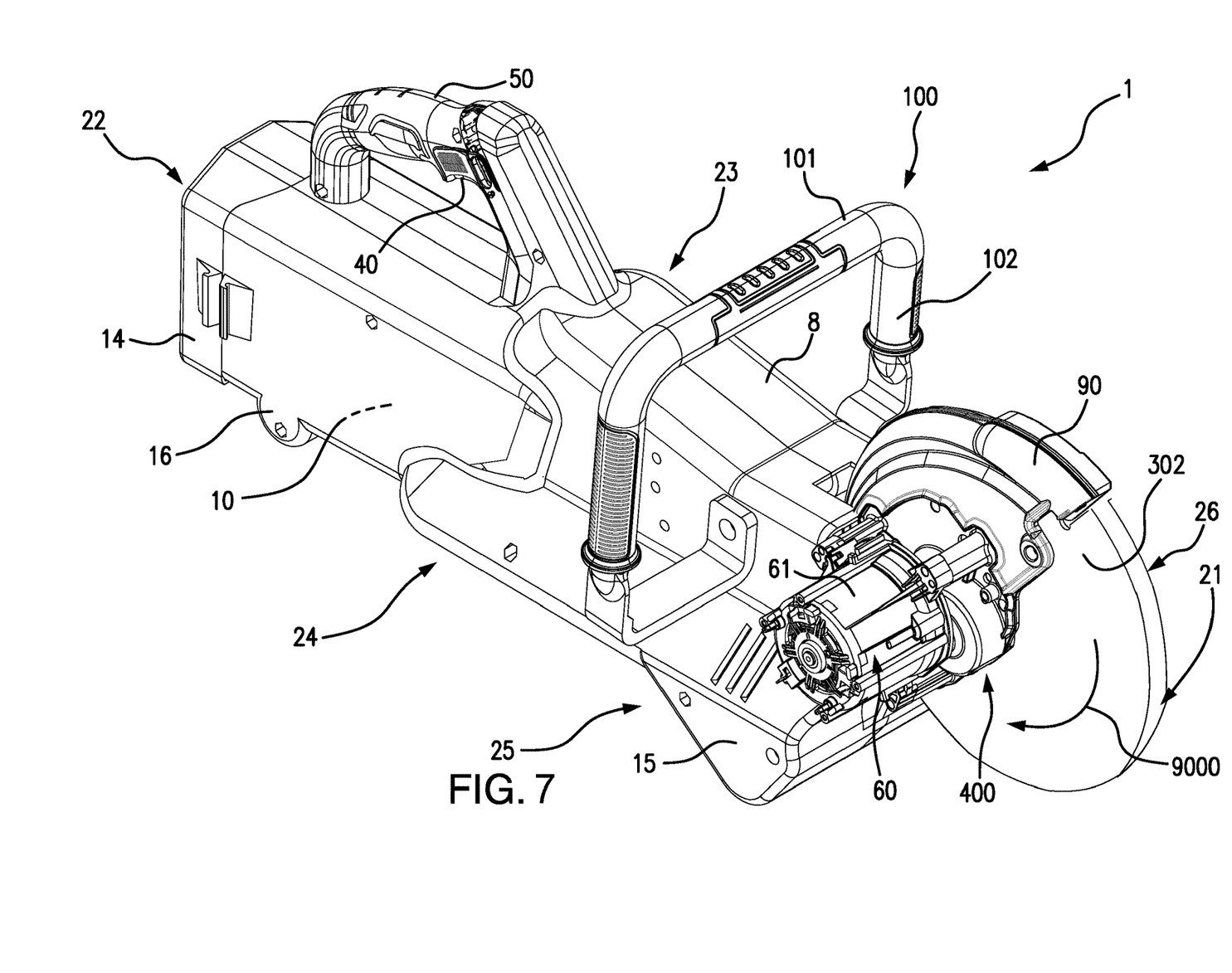
FIG. 7 is a perspective view of the power cutter having a grinding blade.

The front end of the power cutter includes a cutting or abrading member, such as disk 300. The power cutter 1 can use different kinds of disks to cut different materials. By using different types of disks, the power cutter 1 can be used to cut and/or grind a variety of work pieces and materials. For example, the disk 300 can have a diamond or diamond simulant blade for cutting concrete, masonry granite, marble and asphalt. Alternatively, the disk 300 can have an abrasive blade for cutting metal such as a conventional grinding blade 302 as shown in FIG. 7.

As shown in FIG. 2, the rear end 22 of the housing includes the battery pack 10. The battery pack 10 is housed within a battery compartment 12 in the housing 8. A battery cover 14 provided for the efficient placement and removal of the battery pack 10. As shown in FIG. 2, the battery cover 14 is opened to insert the battery pack into the battery compartment 12 and closed to secure the battery pack therein. FIG. 2 shows the battery cover 14 in an open configuration revealing the battery compartment 12, and the battery pack 10 being inserted into the battery compartment, in the direction of arrow 1010. In an embodiment, the battery cover 14 can open and close by moving in directions consistent with directional arrows 1020. For example, the battery cover 14 can be connected to the housing 8 by a hinge assembly and pivot to open and close. Alternatively, any kind of cover or door configuration can be used to secure the battery pack 10 within the battery compartment 12. For example, the batter compartment 12 can be in the center of the power cutter, wherein the battery can be inserted through the top side of the housing.

Electrical energy from the battery pack 10, in the form of DC voltage, can be used to supply power to a motor 60. The battery pack 10 can include one or more batteries and may be of any desired type, such as rechargeable and/or disposable. In the particular example provided, the battery pack 10 is a rechargeable unit that is removable from, and insertable into, a compartment 12 in the housing 8, as shown in FIG. 2. The battery pack 10 can have voltages of 12 volts to 80 volts or greater. The battery pack 10, or other power source, can generate power in a range of 250 Watts to 5000 Watts or greater. The battery pack 10 can be a battery pack as disclosed in U.S. Pat. No. 9,406,915, entitled Power Tool System, which is incorporated herein by reference in its entirety.

The top side 23 of the housing 8 includes a rear or trigger handle 50 and a front or lifting handle 100. The trigger handle 50 may be coupled to the housing 8 and is configured to receive an input from the operator, typically by way of the operator's finger, which may be employed in conjunction with a trigger switch 40 to generate a trigger signal that may be employed in whole or in part to initiate the power to the motor 60. The trigger switch 40 is moveable between an unactuated state and an actuated state. In an embodiment, the trigger switch 40, in an actuated state, provides a set speed for the rotating disk 300. Alternatively, in another embodiment, the trigger switch 40 can control the battery voltage across the motor 60 and, therefore, the current flowing through the motor 60 to provide an operator with the capability of varying the speed of the rotating disk 300 to suit various work needs. The disk 300 can rotate in a tangential direction 9000.

The lifting handle 100 on the top side 23 of the housing 8 projects upwardly, away from the upper surface of the housing. The lifting handle may be coupled to the housing and is configured to be grasped by the operator. In an embodiment, the lifting handle 100 can be in the form of an open loop handle having a transverse portion 101 and a pair of legs 102 extending from the transverse portion. The legs 102 are fixedly mounted to the housing 8. In the embodiment illustrated, one leg 102 can be mounted on the motor side 25 of the power cutter 1, while the other leg 102 can be mounted on the disk side 26 of the housing. An operator can hold and use the power cutter 1 by gripping the lifting handle 100, for example by the transverse portion 101 and by the trigger handle 50.

The bottom side 24 of the housing 8 includes a front base member 15 and a rear base member 16. The front base member 15 and the rear base member 16 project from the bottom side 24 downwardly in a direction away from the bottom surface of the housing 8. The power cutter 1 is designed to be placed on a workpiece or surface upon the front base member 15 and the rear base member 16, such that no portion of the disk will contact the workpiece or surface upon which the power cutter 1 is placed.

In addition, the power cutter 1 is defined by a power section toward the rear end of the housing and a cutting section toward the front end 21 of the housing 8. The power cutter 1 is weight-balanced between the power section and the cutting section, such that when the operator lifts and holds the power cutter by only the transverse portion 101 of the lifting handle 100, the power cutter is parallel to a horizontal surface, such as the ground, without tilting toward the front end 21 or rear end 22, or toward the motor side 25 or disk side 26. As a result of the balance of weight between the power section and the cutting section, tilt-free lifting of the power cutter 1 can be achieved when the power cutter is lifted off of, suspended above, or set down upon a surface, by only the transverse portion 101 of the lifting handle 100. For example, when the operator is in the process of setting the power cutter 1 on the workpiece or surface, the power cutter bottom side 24 remains parallel to the ground. Thus, even while the disk is still rotating, the power cutter can be placed on a horizontal flat surface without tilting. As such, the rotating disk would not contact the surface it is being placed upon. As a result of the weight-balancing of the power cutter 1, the operator is also able to avoid premature fatigue and can continue to use the power cutter for longer periods of time.

In the power cutter 1, the weight of the power section 9800 is calculated as the center of mass of the power section $M_{Power\ Section}$ multiplied by its distance $D_{Power\ Section}$ from the center of gravity 5000. The weight of the cutting section 9900 is calculated as the center of mass of the cutting section M$_{Cutting\ Section}$ multiplied by its distance D$_{Cutting\ Section}$ from the center of gravity 5000. Balancing the weight between a power section 9800 and a cutting section 9900 means balancing the moment arms MA of the center of mass of the power section and the center of mass of the cutting section, to be substantially equal. Balancing the weights or moment arms can be expressed by the following equation:

$$M_{Power\ Section} \times D_{Power\ Section} = M_{Cutting\ Section} \times D_{Cutting\ Section},\ \text{wherein}\ M \times D = MA$$

Figure 3:
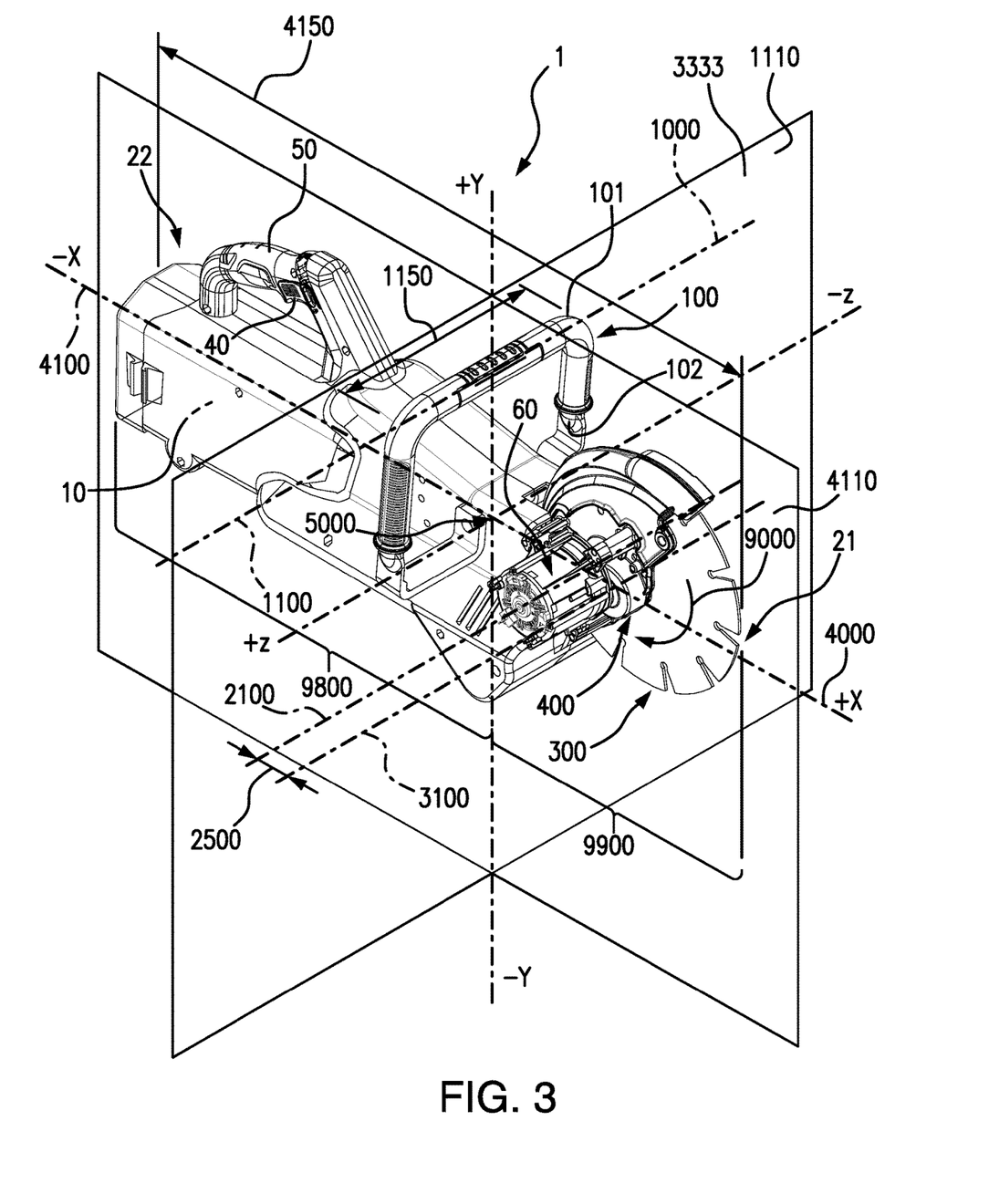
FIG. 3 shows geometric details of the power cutter.

Therefore, even if M$_{Power\ Section}$ is less than M$_{Cutting\ Section}$, specifically, when the power cutter has an unequal weight distribution, the tool can still maintain a level-to-the-ground orientation, while suspended, by locating the lifting handle in a balancing plane between the power section 9800 and cutting section 9900, as illustrated in FIG. 3.

FIG. 3 shows geometric details of the power cutting tool and the planes through which weight-balancing is achieved. The power cutter 1 has a lifting handle plane 1110, a cutter longitudinal plane 4110 and a balancing plane 3333. As shown, the power cutter 1 has a cutter length 4150 defined along the X-axis between the outermost portion of the disk 300 at the front end 21 of the housing 8 to the battery compartment cover 14 at the rear end 22 of the housing. A cutter centerline 4000 and a cutter longitudinal axis 4100 extend along the cutter length 4150. As shown, the cutter centerline 4000 can be collinear and coaxial with the cutter axis 4100. Alternatively, the cutter centerline 4000 and the cutter longitudinal axis 4100 can be parallel to each other. The cutter centerline 4000 and cutter longitudinal axis 4100 can lie within a cutter longitudinal plane 4110. The power cutter 1 has a width that is traversed by the lifting handle 100. In an embodiment, the lifting handle 100 can have a width 1150 defined along the Z-axis that extends across the cutter length 4150. A lifting handle centerline 1000 can be collinear and coaxial with a lifting handle axis 1100, and can extend along the lifting handle width 1150 of the transverse portion 101 of the lifting handle 100. The lifting handle centerline 1000 and the lifting handle axis 1100 can lie within a lifting handle plane 1110. The lifting handle plane 1110 can extend vertically along the Y-axis.

The example embodiment of FIG. 3, illustrates the power section 9800 and the cutting section 9900. The power section 9800 can include the battery pack 10, the trigger handle 50, a portion of the housing 8, and a portion of the lifting handle 100. The cutting section 9900 can include a portion of the housing 8 and a portion of the lifting handle 100, as well as the motor 60 and the disk 300. The weight of the power section 9800 is balanced against the weight of the cutting section 9900 on either side of the balancing plane 3333. This weight-balancing defines the center of gravity 5000 of the power cutter 1 along the cutter longitudinal plane 4110 at a point on the balancing plane 3333. In an embodiment, the balancing plane 3333 can be coplanar with the Y-axis and pass through the lifting handle axis 1100, such that the center of gravity 5000 is between the lifting handle axis 1100 and the bottom side 24, on the balancing plane 3333.

Figure 6:
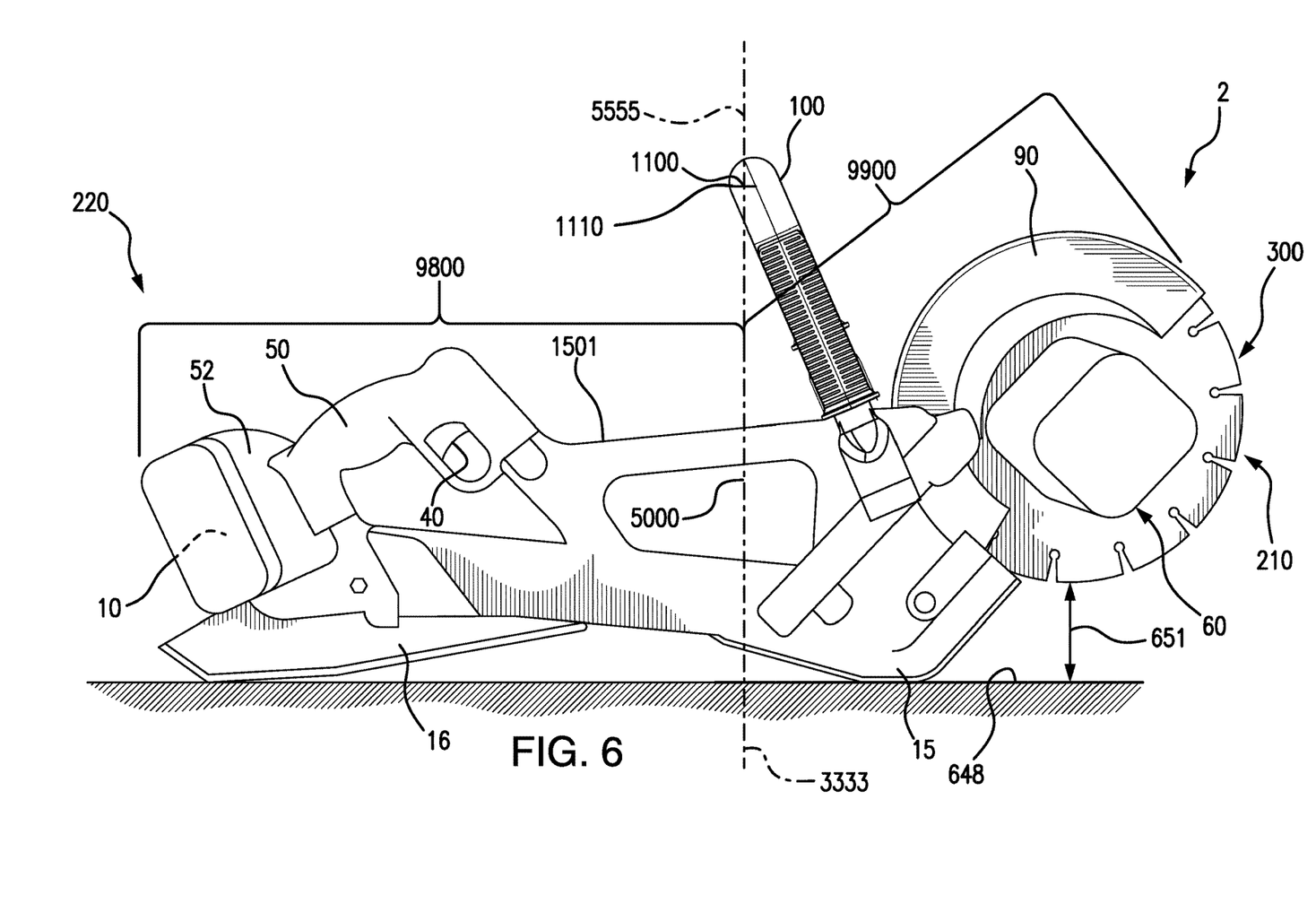
FIG. 6 is a side view of a second embodiment of the power cutter.

In the non-limiting example of FIG. 3, the lifting handle 100 is set at a location that balances the weight of the power section 9800 against the weight of the cutting section 9900, as measured respectively on either side of the balancing plane 3333. The balance of weight for the power section 9800 is measured from the center of gravity 5000 along the negative X-axis. The balance of weight for the cutting section 9900 is measured from the center of gravity along the positive X-axis. In this example, the balancing plane 3333 passes through the lifting handle axis 1100 and bisects the lifting handle 100 vertically along the Y-axis coplanar to the lifting handle plane 1110 at a point along the cutter longitudinal axis 4100. In an embodiment of the present invention, the power section 9800 and the cutting section 9900 can have different weights. Alternatively, the power section 9800 and the cutting section 9900 each have the same weight. In alternative embodiments, the center of gravity 5000 can be located coplanar with the lifting handle axis 1100, as illustrated in FIG. 6. Therefore, when the operator lifts the power cutter 1 with one hand, by the lifting handle 100, the power cutter is positioned substantially horizontally or parallel with the ground. Accordingly, when the power cutter 1 is suspended by the lifting handle 100, the power cutter remains substantially horizontal or parallel with the ground.

The power cutter 1 is both balanced and lightweight to achieve ease of operator use. For example, the power cutter 1 can have a weight when both the power source, such as battery pack 10, and the disk 300 are attached of 30 lbs. to 8 lbs. or less.

FIG. 3 also shows a motor axis 2100 and a disk axis 3100. The motor axis 2100 is arranged parallel to the disk axis 3100. In an embodiment of the present invention, the motor axis is configured in a non-perpendicular relationship with the disk axis 3100. The motor can have be offset from the disk by a distance 2500 between the motor axis 2100 and the disk axis 3100. The purpose of the motor being offset from the disk is to position the motor higher on the power cutter, that is, farther away from the bottom side 24 of the housing 8, to provide a depth of cut 600 (see FIG. 5). Alternatively, the motor axis 2100 can be coaxial with the disk axis 3100 without an offset.

The power cutter 1 can have a motor speed that is consistent with the cutting operation to be performed. For example, the motor 60 can be set to a desired motor speed, as well as optionally switched between speed settings. In an embodiment, the motor 60 can have speed in a range of, for example, 8,000-30,000 rpm or greater.

Figure 4:
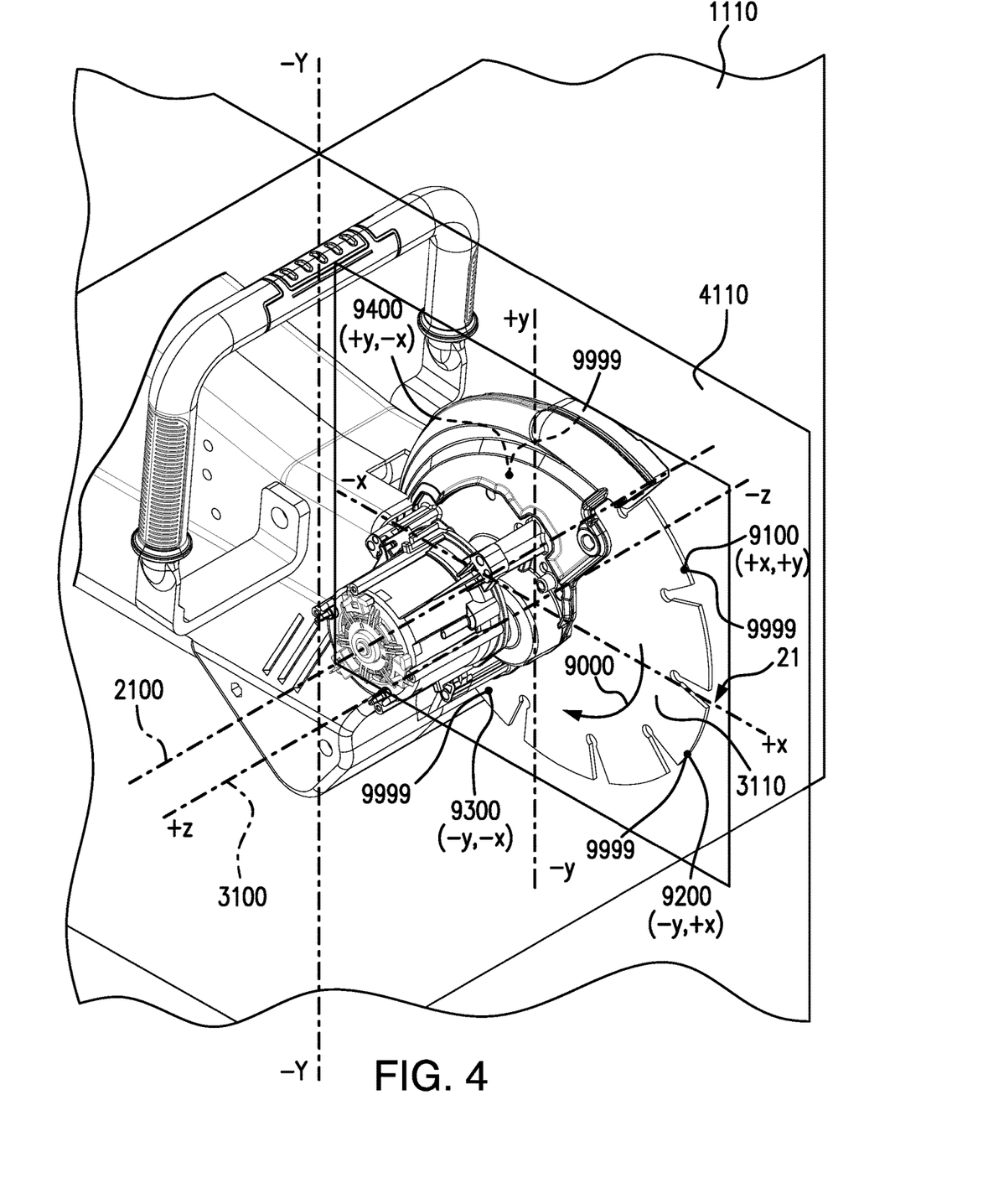
FIG. 4 is a view of the configuration and rotation of the disk.

The disk 300 can have a rotational speed of 3,450-10,000 rpm, which can be the same as or different from the speed of the motor 60. When the motor axis 2100 and the disk axis 3100 are collinear or coaxial, without a transmission system (direct drive), the motor 60 can have a rotational speed of 3,450 to 10,000 rpm or greater. Alternatively, when motor axis 2100 and the disk axis 3100 are collinear or coaxial, but with a transmission system, the motor 60 can have a rotational speed of 3,450 to 30,000 rpm or greater. FIG. 4 is a view of the configuration and rotation of the disk 300. The motor can rotate the disk 300 in a positive tangential direction. Herein, the term "positive tangential direction" means a rotation in the direction of a tangential direction arrow 9000. Herein, the term "positive tangential direction" also means a direction of rotation of the disk 300 that is coplanar to a disk centerline plane 3110 vertically defined on the Y axis of the X, Y, Z coordinate plane shown in FIG. 3 and in the disk centerline plane 3110 a portion of the disk rotates in a direction from the quadrant +X, +Y, then to +X, −Y as part of its rotation. As an example of disk rotation in the positive tangential direction 9000, a disk portion 9999 rotates from a first point 9100 at +X,+Y, then to a second point 9200 at +X, −Y then to a third point 9300 at −X, −Y, then to a fourth point 9400 at −X, +Y and then back to the first point 9100 at +X,+Y; thereby the disk 300 completes one full rotation in the positive tangential direction.

Figure 5:
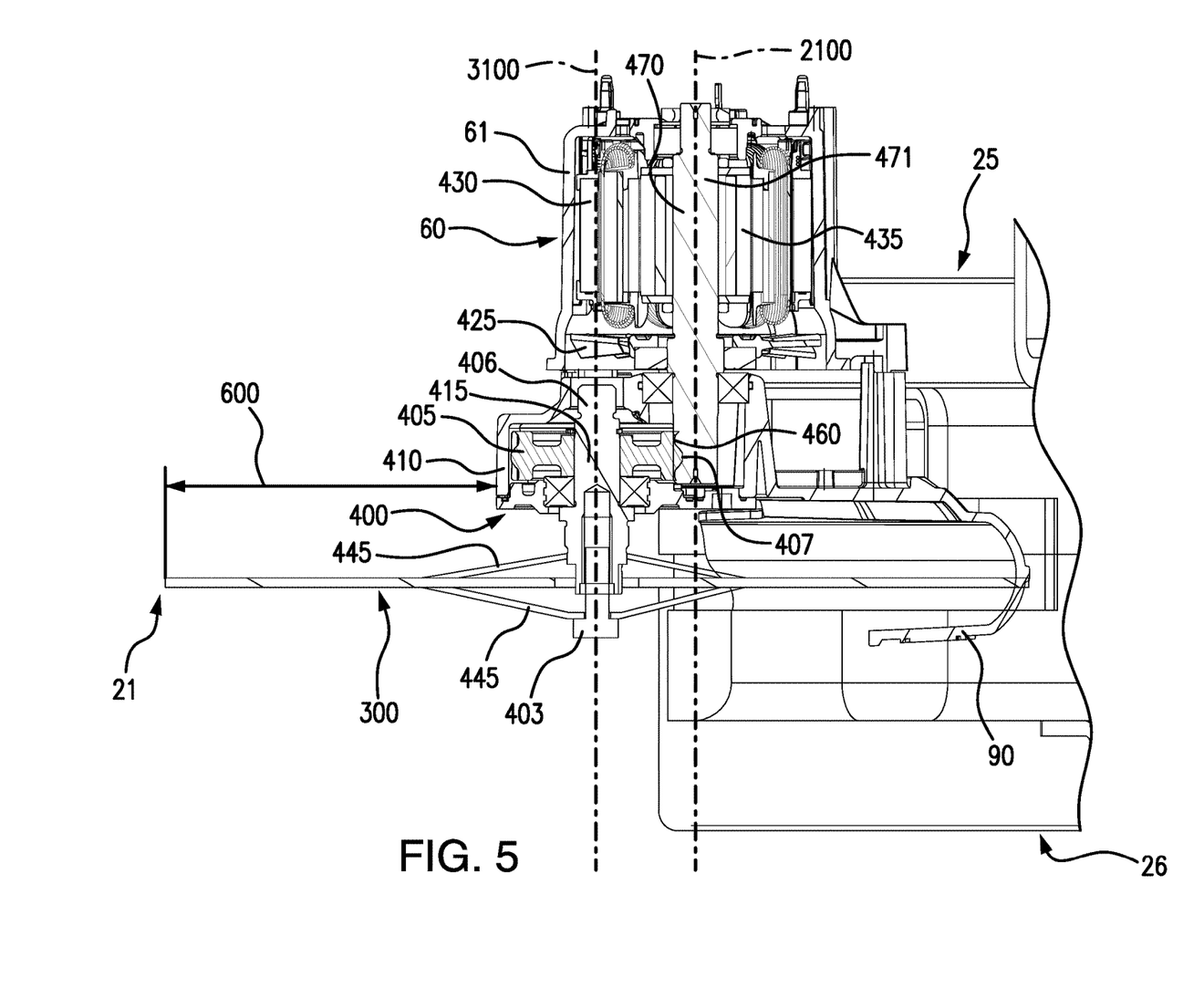
FIG. 5 is a longitudinal horizontal sectional view of the motor and disk.

FIG. 5 is a front sectional view of the motor 60, disk 300 and belt-free drive system 400. The motor 60 drives the belt-free drive system 400, which, in turn, imparts rotation to the disk 300. The motor 60 is at least partially housed within a motor housing 61 and includes a stator 430, a rotor 435, a motor shaft 470 and a fan 425 driven by the motor shaft. In an embodiment, the motor 60 can be either a brushless motor or a motor having a brushed motor system. The motor shaft 470 is press-fit to the rotor 435, as is known in the art, and includes a number of pinion teeth 460. The pinion teeth 460 engage corresponding teeth 407 on a transmission or output gear 405 to rotate an output shaft 415. Alternatively, the motor shaft 470 can engage a separate pinion member having the pinion teeth. The disk 300 is clamped to and, thereby, rotated by the output shaft 415 about the disk axis 3100. In the non-limiting example embodiment of FIG. 5, the disk 300 can be secured to the output shaft 415 by a blade retention screw 403 and one, or more, of an output blade clamp washer 445.

In the embodiment of FIG. 5, the belt-free drive system 400 is a geared or transmission system that is driven by the motor 60. A gear case 410 at least in part covers the pinion teeth 460 of the motor shaft 470 and at least a portion of the output gear 405. As shown, in the belt-free drive system 400, the motor transmits rotational energy to the disk 300 through a series of gears and shafts, for example, motor shaft 470, the output shaft 415, and the output shaft gear 405. The transmission system is configured to position the motor 60 and thereby the motor axis 2100 toward the top side 23 of the housing 8, and/or away from the disk axis 3100 and the front end 21. Thus, the motor axis 2100 is farther away from the work piece surface than if the motor axis and disk axis 3100 were coaxial. As a result, the depth of cut 600 of the power cutter 1 can be preserved or increased. Whereas a larger motor having a motor axis coaxial with the disk axis, would decrease the clearance between the disk and the workpiece and reduce the depth of cut, the same size motor moved away from the workpiece surface through the illustrated transmission gears, increases the depth of cut. As a result, a larger motor in the belt-free drive system with transmission gears can provide more power than a smaller motor mounted in a direct drive system in which the motor 60 rotates the disk 300 directly.

FIG. 5 shows a non-limiting example of the gearing of the belt-free drive system 400. A motor shaft axis 471 of motor shaft 470 is shown to have a configuration that is coaxial with motor axis 2100. The pinion teeth 460 of the motor shaft 470 are shown engaged with output gear teeth 407 of output gear 405. An output gear axis 406 of output gear 405 is shown to have a configuration coaxial with disk axis 3100. A disk guard 90 can be mounted on the housing 8 to protect the operator from cutting debris. The disk guard 90 rotates and/or pivots along the disk axis at any cutting angle of the disk 300. As a result, the disk guard 90 covers 180 degrees of the disk 300 at all times.

FIG. 6 illustrates a second embodiment of the present invention. In this embodiment, a cordless power cutter 2 has a battery foot 52 at the base of the trigger handle 50. The battery foot 52 accepts the battery pack 10. The trigger handle 50 and the battery foot 52 are connected to a saw frame 1501 at a rear end 220 of the saw frame and the disk 300 and disk guard 90 are rotationally mounted to the saw frame at a front end 210 of the saw frame. The lifting handle 100 is connected to the saw frame 1501. Alternatively, the lifting handle 100 can be connected to the disk guard 90. The disk guard 90 and gear case (not shown) can be used to support the motor 60.

In FIG. 6, the power cutter 2 is shown resting on a surface 648. The front base member 15 and the rear base member 16 are configured to contact the surface 648 and provide a blade clearance 651. The blade clearance 651 is the distance between the lowermost portion of the disk 300 and the surface 648. The blade clearance 651 ensures that when the power cutter is in a resting position, the disk 300 is not in contact with the surface 648.

The power cutter 2 of FIG. 6 the location of the center of gravity 5000 achieves a balance between the power section 9800 and the cutting section 9900 along the balancing plane 3333. The balancing plane 3333 can be coplanar with a center of gravity plane 5555. The center of gravity 5000 can be at a point between a portion of the lifting handle 100 and front base member 15. The balancing plane 3333 can pass through the lifting handle axis 1100, such that the center of gravity 5000 is between the lifting handle axis 1100 and the bottom side 24, on the balancing plane 3333.

Numeric values and ranges herein, unless otherwise stated, also are intended to have associated with them a tolerance and to account for variances of design and manufacturing. Thus, a number can include values "about" that number. For example, a value X is also intended to be understood as "about X". Likewise, a range of Y-Z, is also intended to be understood as within a range of from "about Y-about Z". Unless otherwise stated, significant digits disclosed for a number are not intended to make the number an exact limiting value. Variance and tolerance is inherent in mechanical design and the numbers disclosed herein are intended to be construed to allow for such factors (in non-limiting e.g., ±10 percent of a given value). Likewise, the claims are to be broadly construed in their recitations of numbers and ranges.

The scope of this disclosure is to be broadly construed. It is intended that this disclosure discloses equivalents, means, systems and methods to achieve the devices, activities and mechanical actions disclosed herein. For each mechanical element or mechanism disclosed, it is intended that this disclosure also encompass in its disclosure and teaches equivalents, means, systems and methods for practicing the many aspects, mechanisms and devices disclosed herein. Additionally, this disclosure regards a power cutter and its many aspects, features and elements. Such a power cutter can be dynamic in its use and operation, this disclosure is intended to encompass the equivalents, means, systems and methods of the use of the tool and its many aspects consistent with the description and spirit of the operations and functions disclosed herein. The claims of this application are likewise to be broadly construed.

The description of the inventions herein in their many embodiments is merely exemplary in nature and, thus, variations that do not depart from the gist of the invention are intended to be within the scope of the invention. Such variations are not to be regarded as a departure from the spirit and scope of the invention.

I claim:

1. A cordless power cutter, comprising:
   a housing disposed along a longitudinal axis of the cordless power cutter;
   a power source removably supported by the housing at one end of the housing;
   a motor mounted to a longitudinally opposite end of the housing, the motor having a motor shaft rotatable about a motor axis, the motor being powered by the power source;
   a drive system proximal to and driven by the motor at said second end of the housing;

a cutting disk having a disk axis not perpendicular to the motor axis, the cutting disk being rotatably driven by the drive system;

a lifting handle mounted to the housing, the lifting handle having a lifting handle axis that is arranged traverse to the longitudinal axis;

a balancing plane perpendicular to the longitudinal axis, the balancing plane dividing the cordless power cutter into balanced weights on either side of the balancing plane; and a center of gravity defined on the balancing plane, wherein the lifting handle axis is disposed on the balancing plane between the power source and the motor.

2. The cordless power cutter according to claim 1, wherein the disk axis is parallel to the motor axis.

3. The cordless power cutter according to claim 1, wherein the drive system comprises an output gear driven by the motor shaft, and an output shaft driven by the output gear, wherein the output shaft rotates the cutting disk.

4. The cordless power cutter according to claim 1, wherein the motor and the cutting disk are disposed on the housing at the longitudinally opposite end thereof which defines a front end of the housing, and the power source is disposed on the housing at the one end thereof which defines the rear end of the housing, and wherein the motor is disposed rearward of the cutting disk.

5. The cordless power cutter according to claim 4, wherein the housing has an upper portion on which the lifting handle is mounted and, wherein a position of the motor axis relative to a top side of the housing is closer than a position of the disk axis relative to the top side of the housing.

6. The cordless power cutter according to claim 1, wherein the motor is an electric motor.

7. The cordless power cutter according to claim 1, wherein the cordless power cutter is a cordless cutoff saw.

8. The cordless power cutter according to claim 1, wherein the cordless power cutter is a cordless concrete saw.

9. The cordless power cutter according to claim 1, wherein the drive system is a transmission system.

10. The cordless power cutter according to claim 1, further comprising at least one base member projecting outwardly from the housing for contacting a resting surface, and providing a clearance between the cutting disk and the resting surface.

11. The cordless power cutter according to claim 1, wherein the power source comprises at least one battery.

12. The cordless power cutter according to claim 1, wherein the cutting disk comprises a cutting blade.

13. The cordless power cutter according to claim 1, wherein the cutting disk comprises one of an abrasive blade and a grinding blade.

14. The cordless power cutter according to claim 1, wherein the housing has a bottom side parallel to the longitudinal axis, and wherein, when the housing is suspended by the lifting handle, and the bottom side of the housing is parallel with respect to a horizontal plane, the weights on either side of the balancing plane are equal.

15. A cordless power cutter, comprising:

a housing disposed along a longitudinal axis of the cordless power cutter, the housing having a first end and a longitudinally opposite second end;

a cutting section at the first end of the housing, the cutting section including an electric motor and a disk blade rotatably driven by the electric motor, the cutting section having a first weight;

a power section at the second end of the housing, opposite to the first end, the power section including a battery that supplies power to the electric motor, and a trigger handle, the power section having a second weight different from the first weight;

a balancing plane perpendicular to the longitudinal axis, the balancing plane located between the power section and the cutting section; and a lifting handle being disposed on the housing between the cutting section and the power section along the longitudinal axis, the lifting handle having a lifting handle axis disposed on the balancing plane between the battery and the electric motor.

16. The cordless power cutter according to claim 15, wherein the balancing plane evenly bisects the lifting handle through the lifting handle axis, and is coplanar with a lifting handle plane at a point along the longitudinal axis.

17. The cordless power cutter according to claim 15, wherein a moment arm of a center of mass of the power section relative to a center of gravity of the cordless power cutter is substantially equal to a moment arm of a center of mass of the cutting section relative to the center of gravity of the cordless power cutter.

18. The cordless power cutter according to claim 15, wherein a center of gravity of the cordless power cutter is between the lifting handle axis and a bottom side of the housing.

19. The cordless power cutter according to claim 15, wherein the cordless power cutter is a cutoff saw.

20. The cordless power cutter according to claim 15, wherein the lifting handle axis is transverse to the longitudinal axis.

* * * * *